5 Sheets—Sheet 1.

J. H. W. BIGGS.
Process of Salt Manufacture and Apparatus Therefor.

No. 239,024. Patented March 22, 1881.

Witnesses:
Will W. Dodge.
Donn P. Twitchell.

Inventor:
J. H. W. Biggs
By his attys.
Dodger Son

5 Sheets—Sheet 2.
J. H. W. BIGGS.
Process of Salt Manufacture and Apparatus Therefor.
No. 239,024.　　　　　Patented March 22, 1881.
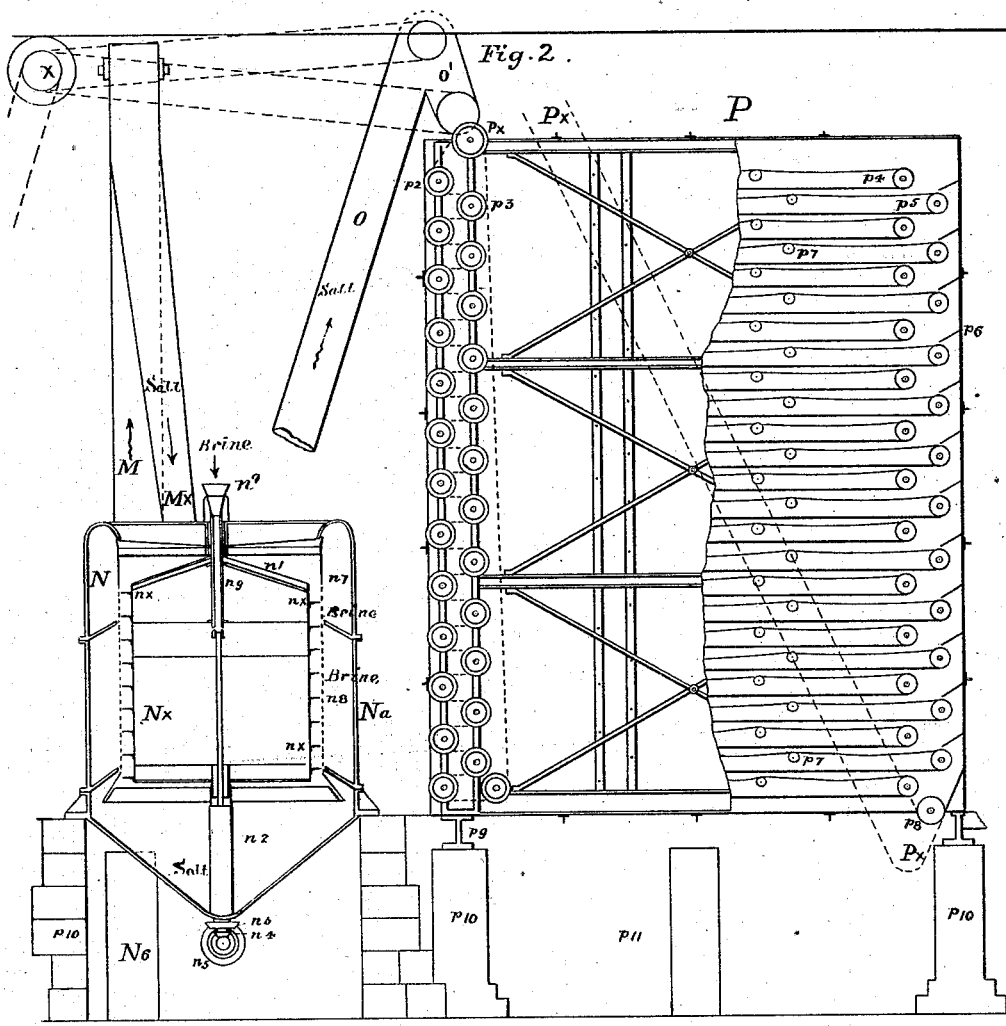
Witnesses:
Will W. Dodge,
Down R. Twitchell.
Inventor:
J. H. W. Biggs.
By his attys.
Dodge & Son

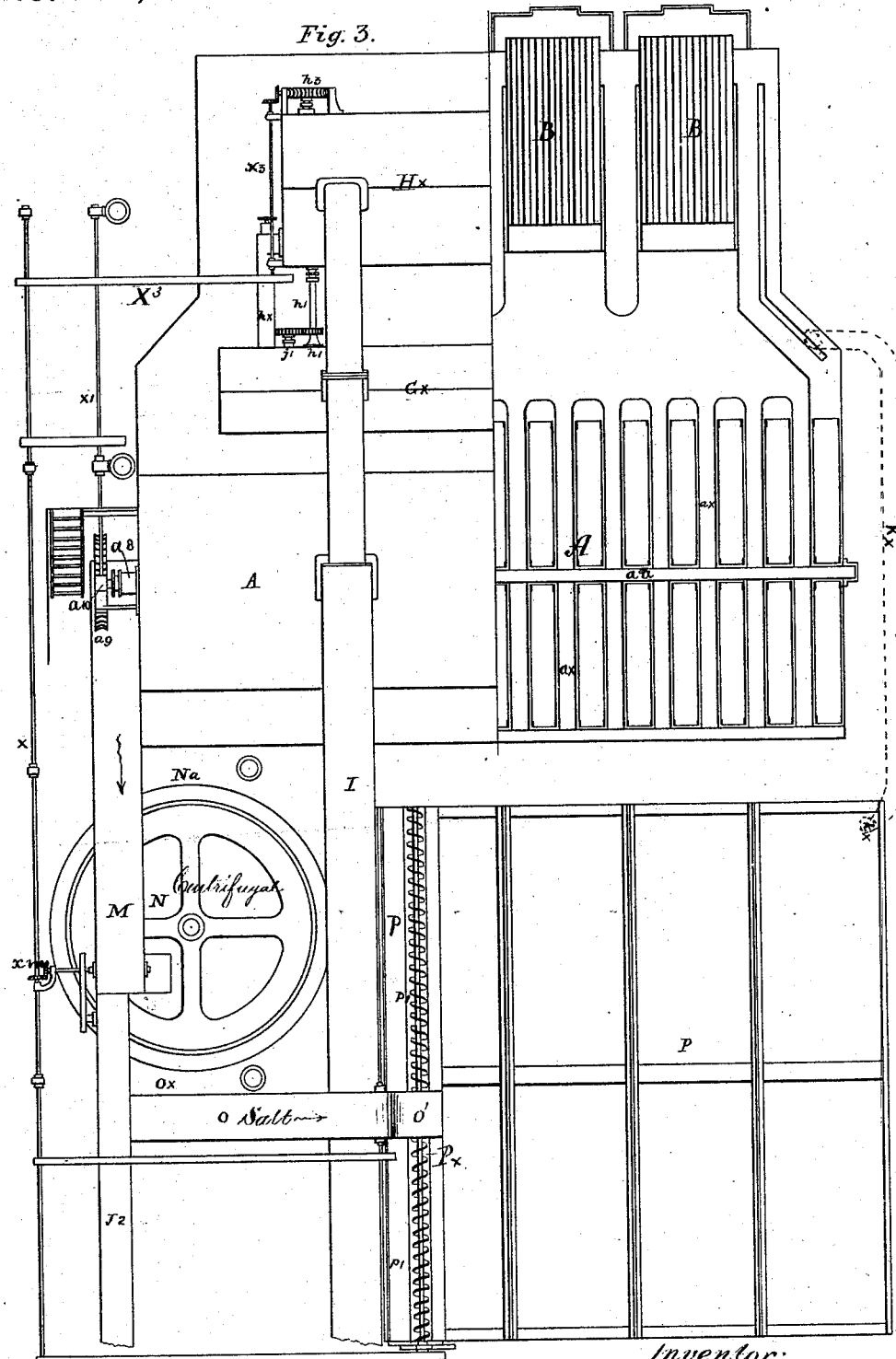

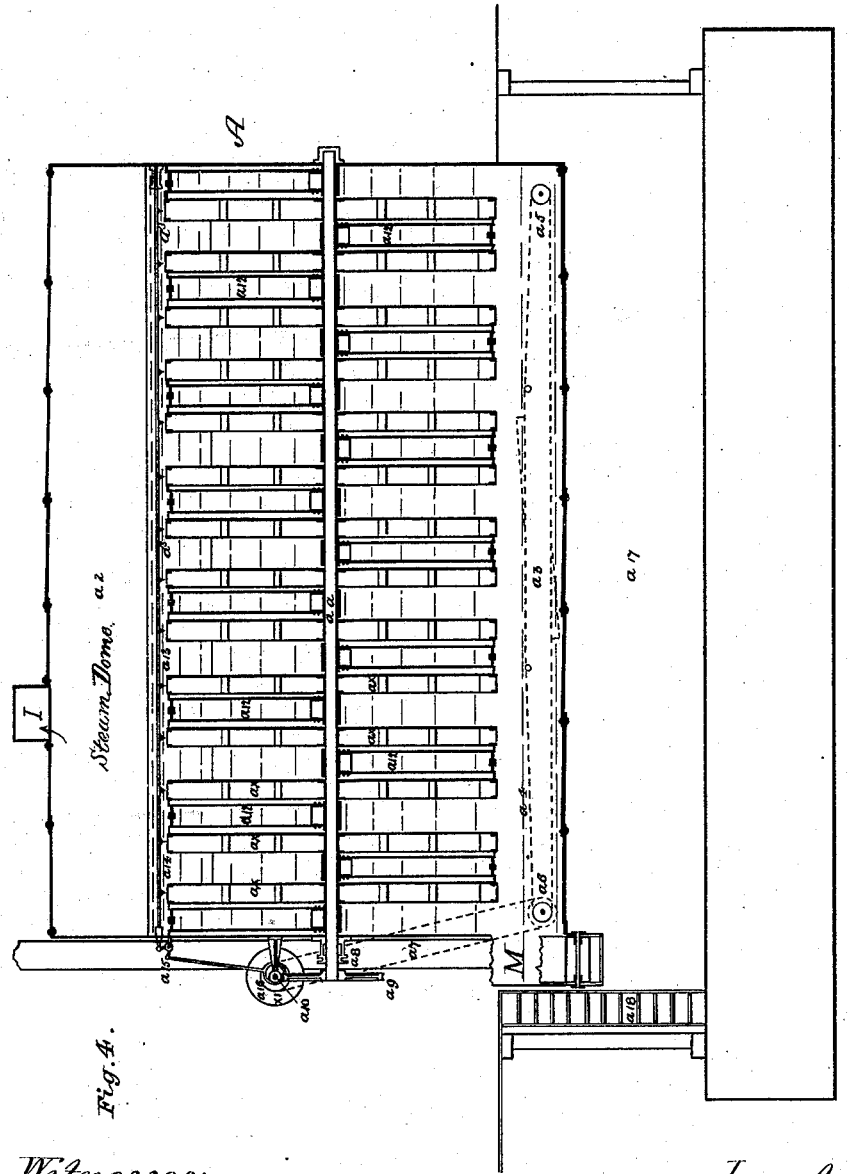

5 Sheets—Sheet 5.

J. H. W. BIGGS.
Process of Salt Manufacture and Apparatus Therefor.
No. 239,024. Patented March 22, 1881.

Witnesses:
Will W. Dodge.
Dann H. Twitchell.

Inventor:
J. H. W. Biggs
By his attys.
Dodger & Son

UNITED STATES PATENT OFFICE.

JOHN H. W. BIGGS, OF LIVERPOOL, COUNTY OF LANCASTER, ENGLAND.

PROCESS OF SALT-MANUFACTURE AND APPARATUS THEREFOR.

SPECIFICATION forming part of Letters Patent No. 239,024, dated March 22, 1881.

Application filed February 13, 1879.

*To all whom it may concern:*

Be it known that I, JOHN HOWARD WORTHINGTON BIGGS, of Liverpool, in the county of Lancaster, in the Kingdom of England, have made certain Improvements in the Process of Salt-Manufacture and in Apparatus Therefor, of which the following is a specification.

This invention is best described by aid of the accompanying drawings, in which—

Figure 1:
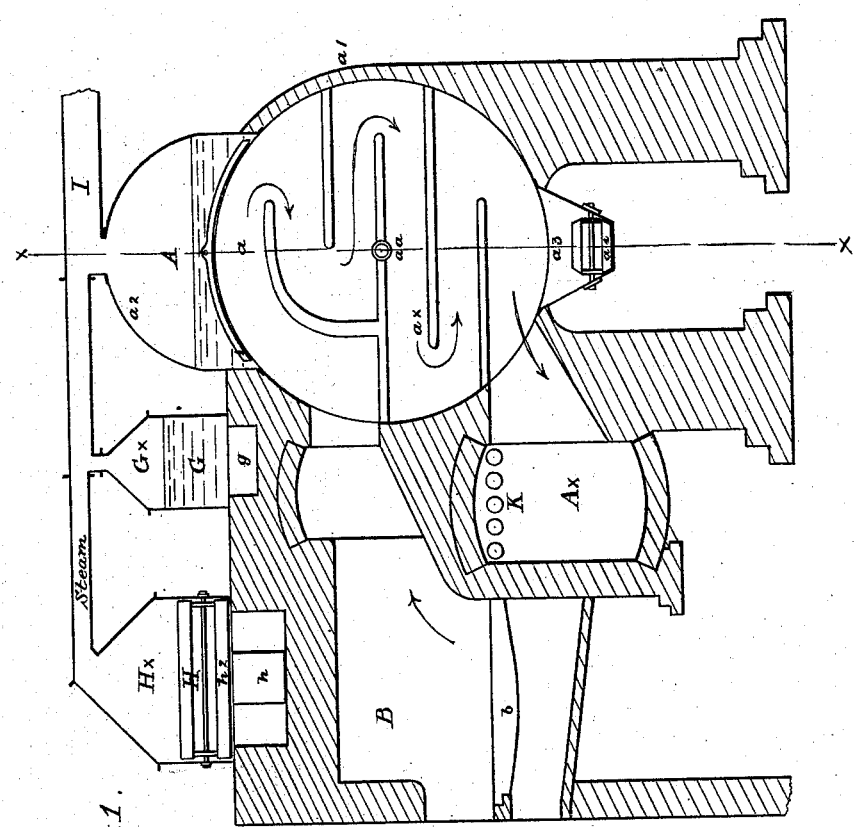

Figure 1 shows a vertical section of table-pan apparatus A, furnace therefor, B, scumming-pan G, scaling-pan H, and air-heating pipes K. These are used in evaporating the salt to the crystallizing stage. Fig. 2, N shows the centrifugal drier for partially desiccating the crystals till they will no longer cake on the belt-stoves, and P the belt-stove for further drying them. Fig. 3 shows a general plan of works, and Fig. 4 a longitudinal vertical section of the table-pans A.

In Figs. 1, 3, and 4, A is the vertical table-pan, each table composed of two side plates, inclosing flues between them. They are set on their edges on suitable masonry or brick-work bedded on concrete. The tables $a$ are placed at a sufficient distance from one another to allow a workman to get down between them for their examination and repair. Their inner flues, $a^x$, are lined with fire-brick, and a girth of the same material at $a'$, made to remove at pleasure, permits their being cleaned, examined, or repaired, as occasion may require. I sometimes place steam-jets in these flues to clean them and blow the ashes and soot through them. The products of combustion enter the table-flues at the top, and pass out at the lower flues to the cross-flue $A^x$.

At the top of the pan there is a steam-dome, $a^2$, with an outlet leading into pipe I. The dome is provided with a man-hole, and is covered with non-conducting cement to prevent radiation.

At the bottom of the pan, below the tables, there is a trough, $a^3$, scraped by endless-chain scrapers $a^4$, which deliver the salt to elevator M. The scraper-chains are carried on drums $a^5$ and $a^6$ at each end, and are turned by a belt, $a^7$, from a shaft, X', Fig. 3, or otherwise. In some cases I use two troughs instead of only one, placing them on each side of the table.

Through the center of the tables there is a long shaft, $a\ a$, supported in suitable bearings and passing out of the pan through a stuffing-box, $a^8$, and turned by a large worm-wheel, $a^9$, and worm $a^{10}$ on shaft X', which is driven by a belt from the main shaft X.

On the shaft $a\ a$ there are the table-scrapers $a^{12}$, balanced opposite one another to ease the driving. The upper surface of the tables is scraped by the reciprocal scrapers $a^{13}$ on a rod, $a^{14}$, passing through a stuffing-box at the end of the pan, and actuated by crank $a^{15}$, moved by an eccentric, $a^{16}$, on shaft X'. Below the pan there is a space left, $a^{17}$, to get under the pan, approached by the ladder $a^{18}$.

Figure 6:
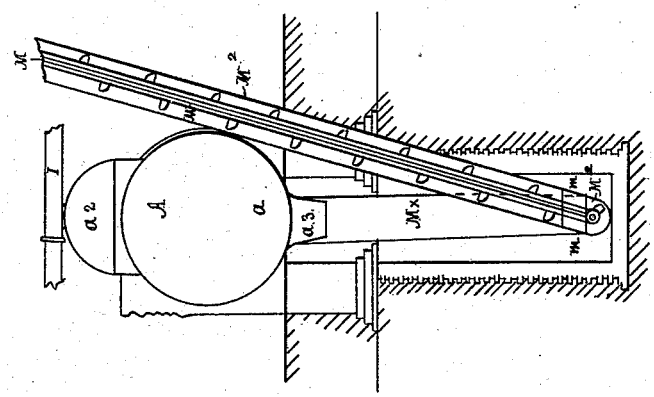
Figure 5:
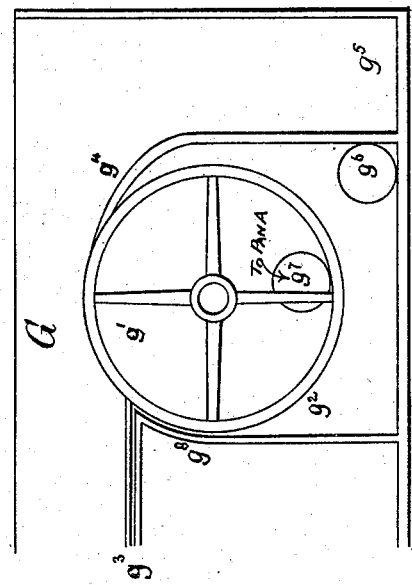

When working the pan *in vacuo* I arrange a deep tube or well, $M^x$, Fig. 6, (a view with the end of the pan and elevator removed,) at the end of the pan, into which the salt is scraped. The elevator M is prolonged and removes the salt from the bottom of the well. The case $M^2$ of the well and elevator acts like the bent siphon-tube of a barometer, maintaining a vacuum within the pan, but permitting the salt to be removed through the depressed brine $m\ m$ in the elevator into an *ex vacuo* store without, or pass it on for further use. In some cases I use a revolving vertical shaft in $M^x$, with blades to keep the salt moving down. There is a valve between the case $M^2$ and the well $M^x$ to shut off the brine in case the elevator requires repairing. I sometimes arrange to heat the pan by gas-furnaces, or by the waste heat from chemical works, iron-works, coke-ovens, and the like, or by steam from a similar pan; but where this cannot be done to advantage I arrange four furnaces, B, as shown in the drawings, Figs. 1 and 3. The products of combustion coming from the tables by flue $A^x$ first heat the air in pipes K for the belt-stove P, and are then conducted by a flue to heat further brine or stoves. On their way part are passed under the preparatory scumming and scaling pans G and H by the flues $g$ and $h$, fitted with dampers to regulate the heat of the pans above. G is arranged as shown in Fig. 5. The scum-pan G is placed over flue $g$. It is fed from a preparatory pan or the brine-head, and supplies A. It is provided with a pocket and a scumming-wheel, $g'$, as shown in Fig. 5, driven slowly from X. The brine from the brine-head or preparatory pan passes through a sieve near $g^6$, containing cow-heels glue, &c., to make the scum rise. This pan may be scraped by mechanism, but is here scraped by hand.

The scum-drum $g'$ (see Fig. 5) is finely perforated or covered with gauze or canvas. It is placed in a compartment, $g^2$, with a projecting ledge, $g^3$, a scraper, $g^4$, and a scum-box, $g^5$. $g^6$ is a door to clean out the compartment $g^2$. $g^7$ connects with pan A. $g^8$ is a slide-door opening holes under $g^3$. The drum is designed to draw off the scum as it drifts up against it by the current of the escaping brine.

To cause the scum to have more time to rise in pan G, I sometimes place a vertical division down the pan and make the brine pass up and down the pan before escaping. This pan communicates with pan H by pipe $h^x$, Fig. 3. Its drum is driven by wheel $j'$, turned by a shaft, $h'$, passing through one end of pan H. This shaft turns the endless chain or link scrapers $h^2$, stretched from end to end of the pan in suitable rollers. There is a screw at one end of the pan for the removal of the scale and matter collected by the scrapers. The scrapers and scumming-drum are driven from shaft X by a belt turning $X^3$, which drives screw-shaft $x^3$, turning a worm-wheel on the end of $h'$. Both pans G and H are covered in with hoods $G^x$ and $H^x$, communicating with the steam-pipe I of the table-pan. There are foot-passages on each side of these pans, so that they may be inspected and attended to from time to time by doors in the hoods.

Part of the steam passing along pipe I is used for driving the apparatus and the remainder for steam-jackets, heating the preparatory pans.

The salt from the table-pan is raised by the elevator M, Fig. 3. This elevator is fitted with draining-buckets. It is driven by gearing $x$ $m$, delivering into the centrifugal drum N. $J^2$ is an elevator used to supply other machines with salt, not described in this specification.

N, Figs. 2 and 3, is the centrifugal drum for throwing off the surplus brine from the salt and for washing it. It is made of metal coated with magnetic oxide, and is preferably placed vertically and based on strong masonry and concrete, with a passage beneath. It may, however, be placed in any suitable position and employed for drying and washing various styles of salt, including film-made salt produced from heated cylinders, flat or other surfaces. The drum N has its sides covered with very fine gauze or canvas, supported by suitable bands or rings, or by an outer perforated casing. Within the gauze drum there is an inner drum, $N^x$, Fig. 2, having on its exterior a long screw-blade, $n^x$, which all but touches the gauze; or it may have separate scrapers in one or more places on the drum, or a long revolving screw, preferably on an axis parallel with the axis of the drum. The drums are mounted on central shafts, and move at a differential speed in such way that when salt is admitted at one end of the drum (in this case the top) it is scraped to the other end by the differential movement of the screw or scrapers within.

I sometimes deliver the salt onto a somewhat flattened radiating or rigid cone at the top of $N^x$, but prefer to spread it out more evenly round the gauze drum by using a spout secured to the top of $N^x$, which is filled near the center, and which delivers the salt onto the gauze at a given depth a little in front of the first lap of the screw. This latter works it down by degrees to the discharge end of the drum, where it falls into the salt-chamber $n^2$.

At the lower ends of the central shafts there are suitable driving-wheels, preferably conical friction-wheels $n^3$ and $n^4$, which rest upon the sloping face of a cone, $n^5$, which is driven by a direct-acting three-cylindered or suitable engine. The difference of the pitch of $n^3$ and $n^4$ regulates the differential speed of the upper drums. The two drums N and $N^x$ are placed in an outer casing, $N^a$, which I sometimes connect with the condenser or flue underneath to carry off the waste vapor. There is a passage, $N^6$, beneath to get at the engine and wheels. Above the salt-chamber $n^2$ there are two compartments, separated by the sloping rings. The upper one, $n^7$, catches the brine thrown off from the first passage of the salt, and this is pumped or run back again into one of the pans for further evaporation, or otherwise treated. The second compartment, $n^8$, catches the brine passed through the salt for cleansing it from deliquescents, and communicates with a tank or drain. $n^9$ is the pipe or funnel by which a small quantity of fully-saturated brine is admitted through the hollow part of the central shaft to the interior of the drum for this purpose.

Pipes for steam or water placed inside $N^a$ are provided for cleaning the gauze externally, and I sometimes provide an additional pipe or pipes internally for washing or steaming the whole of the drum to free the gauze from obstruction, and for the same end occasionally employ brushes in the periphery of the screws $n^x$.

I arrange either to discharge the salt from compartment $n^2$ direct into a pocket near its base, from which it is raised by elevator O, driven by a belt from X, or to pass it by a suitable chute first through two or three pairs of V-grooved grinding-rollers, preferably fitted with scrapers on their under side, and then into the pocket for the elevator O to remove. These rollers are situated at $O^x$, Fig. 3, and, besides reducing the grain of the salt so as to expose a larger surface for evaporation, also serve to equalize the two varieties of salt when coming simultaneously from pan A and ordinary evaporating-pans. The salt raised by elevator O passes by a chute, $o'$, into a trough, $p$, wherein there is a right-and-left-hand screw, $p'$, which spreads it out for distribution on the moving belts in the belt-stove P, as shown in Fig. 3. The trough $p$ opens onto a roller at its bottom, which slowly turns, delivering the salt on the belt beneath. It has one or more long grooves or spaces in it lengthwise, and as it turns the salt passed along its top by the screw $p'$ collects in the space, and is removed and thrown out on the moving belt beneath. In place of this measuring-roller I sometimes employ other arrangements, such as holes at frequent intervals along the bottom of the screw-trough $p$, allowing the salt to run through direct onto the moving belt beneath, the same being afterward equalized by passing under a spreading-bar placed, say, about an inch over and a little way down the belt.

The endless belts in P pass round rollers $p^2$ and $p^3$ at one end and $p^4$ and $p^5$ at the other. Their ends alternately project beyond each other in such way that salt placed upon them is passed or scraped successively from one belt onto the other, being taken backward and forward against currents of warm or hot air. There are inclined pieces to direct the salt at $p^6$, and end scrapers may also be used to loosen the salt on the belts, if required. The belts are arranged to move very slowly, so that the salt may be exposed for some time for drying. They are here driven by an endless belt or chain passing round the wheels on the end of $p^2$ and $p^3$, and also round the wheel of measuring-roller $p^\times$, which is intergeared with the screw-shaft and driven by a belt, or may be turned by a screw-shaft and worm-wheels from the main shaft X. There are suitable spreaders, rakes, &c., under which the salt on the belts passes, which keeps it well exposed to currents of warm air, which I sometimes blow directly on it by perforated pipes placed across the belts. The belts are supported at intervals on rollers $p^7$. The salt from the last belt is collected by a chain-scraper or screw, $p^8$, and delivered by a suitable spout. The stove-chamber is strongly put together to resist the heavy end drag of the belts. It is supported on strong girders $p^9$ and walls $p^{10}$, with internal and external girders and strengthening-rods, as shown, Fig. 2, or otherwise. There is a passage, $p^{11}$, beneath to examine the bottom. Heated air from the furnace-pipes K, Fig. 1, is conducted by the pipe $K^\times$, Fig. 3, and enters the stove at its bottom at $k^\times$, from whence it is distributed, by suitable pipes and passages, over and below the belts. The heated air is passed or drawn off at the top and allowed to escape by suitable pipes.

The belts are preferably made of gauze or canvas prepared with tan or cutch to make them more durable, but may be constructed of parallel plates or sections jointed together, and the rollers be shaped to aid their passing round them. These sections may also have wheels to run along suitable rails in the stove.

I do not claim in the present case the details of construction of the centrifugal drier, nor of the belt-stove, said apparatuses being made subject-matter of separate applications filed by me, and being involved in the present application only so far as they are necessary to the carrying out of the process herein described and claimed.

I claim as my invention—

1. The combination of scumming-pan G, arranged substantially as described, with scum-drum $g'$.

2. Table-pans A, constructed of plates or sides, with winding flues between them, entering at the top and leaving them at the bottom.

3. The combination of tables A (arranged either vertically, horizontally, or otherwise, but parallel with each other) with moving scrapers continually or intermittently scraping off the salt as it forms on both sides or surfaces of said tables.

4. The combination of tables A, heated by internal flues, $a^\times$, shaft $a\ a$, scrapers $a^{12}$ and $a^{13}$, and bottom-scrapers or delivering apparatus $a^4$ and M.

5. The combination of table-pans A, strongly heated by internal flues, $a^\times$, scrapers $a^{12}$ and $a^{13}$, and contracted orifice for the steam, causing a violent ebullition on the nearly-clean surface and the formation of very small crystals of salt instead of large coarse ones.

6. The combined arrangement of table-pans A, furnace B, flues $A^\times$, $h$, and $g$, and pans H and G.

7. The mode of drying salt consisting in first throwing out the surplus moisture by a centrifugal machine, and then, when sufficiently solid or pulverulent not to cake fast on the belts, drying it in a belt-stove, as set forth.

8. The herein-described apparatus for the manufacture of salt by a continuous process, consisting of tables A and furnace for heating the same, centrifugal drier N, belt-stove P, and conveyers, substantially as shown and described, for conveying the material under treatment from one part of said apparatus to another.

9. The combination of the tables A in a chamber worked by exhaustion, so as to be relieved of a large part of the atmospheric pressure, well $M^\times$, and elevator M, for the purposes described.

JOHN H. W. BIGGS.

Witnesses:
 WM. P. THOMPSON,
 JOHN O. O'BRIEN.